United States Patent [19]
Ebersberger

[11] 3,828,217
[45] Aug. 6, 1974

[54] SELF BALANCING ROTARY ANODE ARRANGEMENT FOR X-RAY TUBES

[75] Inventor: Johann Ebersberger, Markt Erlbach, Germany

[73] Assignee: Siemens Aktiengesellschaft, Erlangen, Germany

[22] Filed: May 3, 1973

[21] Appl. No.: 356,754

[30] Foreign Application Priority Data
May 26, 1972 Germany............................ 2225806

[52] U.S. Cl...................... 313/149, 313/60, 74/574
[51] Int. Cl....... F16f 15/12, H01j 1/44, H01j 35/10
[58] Field of Search ................ 313/60, 149; 74/574; 64/1 V

[56] References Cited
UNITED STATES PATENTS
| | | | |
|---|---|---|---|
| 2,220,524 | 11/1940 | Kapitza | 74/574 |
| 2,557,542 | 6/1951 | Kapitza | 74/574 |
| 3,634,870 | 1/1972 | Kessler | 313/60 |

FOREIGN PATENTS OR APPLICATIONS
| | | | |
|---|---|---|---|
| 1,050,918 | 2/1959 | Germany | 313/60 |

Primary Examiner—James W. Lawrence
Assistant Examiner—Wm. H. Punter
Attorney, Agent, or Firm—Richards & Geier

[57] ABSTRACT

A rotary anode arrangement for X-ray tubes wherein the anode plate and the driving rotor are connected with each other and are also connected with the connection of both outer rings of two bearings spaced from each other. Their inner rings lie upon a shaft constituting the rotary axis and located in a tubular piston. The invention is particularly characterized in that the driving rotor as well as the connection to the anode plate extend along the spacing between the two bearings and are fixed to the connection of the two bearings close to the edge of the bearing distant from the plate. At least a part of the connection between the plate and the attachment to the bearings consists of a tube with thin walls which constitutes a resilient element for selected sizes.

5 Claims, 2 Drawing Figures

PATENTED AUG 6 1974  3,828,217

SELF BALANCING ROTARY ANODE ARRANGEMENT FOR X-RAY TUBES

This invention relates to a rotary anode arrangement for X-ray tubes wherein the anode plate and the driving rotor are connected with each other and are also connected with the connection of both outer rings of the two bearings spaced from each other. Their inner rings lie upon a shaft constituting the rotary axis and located in a tubular piston.

In known X-ray tubes with rotary anodes loud running noises and percussions take place in the bearing of the rotary part. This is caused for the fact that the unbalance of the rotary masses can never be completely eliminated. Furthermore, particularly the start of the run and the braking cause blow-like effects upon the bearings with the result that the running surfaces of the ball bearing rings and the balls change their shape and wear out.

The present invention is based on the consideration that the blows and unbalances in the bearings of the rotary anode have a detrimental effect, since the wear out affects the function of the bearings, such as the worsening of the running rest and life duration.

Thus an object of the present invention is to avoid the effect of thrusts to the greatest possible extent.

Other objects will become apparent in the course of the following specification.

In the accomplishment of the objectives of the present invention it was found desirable to arrange the driving rotor as well as the connection to the anode plate so that they extend along the spacing between the two bearings and are fixed to the connection of the two bearings close to the edge of the bearing distant from the plate, whereby at least a part of the connection between the plate and the attachment to the bearings consists of a tube with thin walls which constitutes a resilient element for selected sizes.

Due to this arrangement percussions by impacts are resiliently received in the tubular element. Thus a percussion free running of the tube is produced by an advantageously simple construction. On the other hand the resilient members also produce extended heat conducting passages between the rotary anode plate, i.e., the source of heat, and the bearings, which are additionally protected in this manner.

According to an embodiment of the present invention the resilient elements, as already stated, can consist of a tube or of flanges of a slit tube. In case of a known rotary anode having a plate consisting of a base of molybdenum alloy and a covering coating of a tungsten alloy, which jointly have a thickness of about 10 mm, the diameter of the plate being about 100 mm, a tube is used as a connecting resilient member having a diameter ranging between 30 mm to 50 mm, preferably 45 mm, which consists of iron and has a wall thickness of about 0.5 mm. For different conditions, for example, when the plate has a different weight, other wall thicknesses may be suitable, for example, 0.2 mm to 0.8 mm. The slits which may be provided in the tube to increase the resiliency can be spaced, for example, at about 10 mm from each other and can have a width of about 1 mm. These measurements result in individual cases from the stability which is to be obtained and the properties of the basic material. The length of the slits has its best possible effect when there is the greatest possible spacing between the holds of the anode plate and the rotary element holding the bearing which amounts in existing tubes to about 80 mm to 100 mm. The great advantage of the construction based on a tube consists in that all resilient elements are combined in a single part which is already of a compact structure. A further improvement of the resiliency conditions can be attained when the flanges after the cutting of the tube are pressed plate-like or into another profile, so that they become similar to flat sheet springs, etc.

According to another embodiment of the present invention the resilient parts can consist of individual resilient sheet-like strips from rods of round material or other cross-sections, which are joined into a resilient tube. An advantage of this construction is that for the making of tube-like damping member it is possible to use resilient material, such as steel etc., of suitable properties, form, cross-sections, etc.

The invention will appear more clearly from the following detailed description when taken in connection with the accompanying drawing showing by way of example only, preferred embodiments of the inventive idea.

Figure 1:
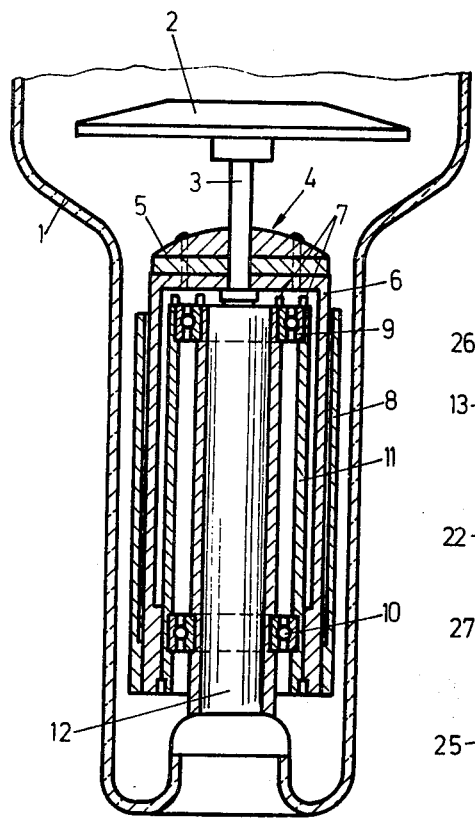
FIG. 1 is a section through a rotary anode of an X-ray tube, showing its rotary system, wherein the connection of the plate with a bearing remote from the plate is by a slit tube.

FIG. 1 shows a part 1 of an X-ray tube container at the end of which the rotary system shown in section is located. This system includes the anode plate 2 connected by an axle 3 with the actual rotor system 4. This system includes the axle support 5 with which the tubular part 6 having slits 7 is connected. A member 8 of copper is located beyond the slit tube 6 and concentrically thereto. The member 8 cooperates in a known manner with the stator (not shown) to provide the drive of the rotary system 4. The two bearings 9 and 10 are connected with each other by their outer rings through the tube 11 while their inner rings are mounted upon the shaft 12 which is vacuum tightly connected with the casing 1.

In this embodiment of the present invention in case of an impact reaching through the plate 2 the tube 6, a change of shape takes place in the straps remaining between the slits 7. Due to this tendency to bend the tube 6 a detrimental transmittal of the impact to the bearings 9 and 10 is prevented by damping. The space of about 1 mm width remaining between the tube 6 and the copper cylinder-shaped member 8 leaves enough space for receiving swingings. Furthermore, the existing residual imbalance of the system is balanced in the resilient tube 6.

Figure 2:
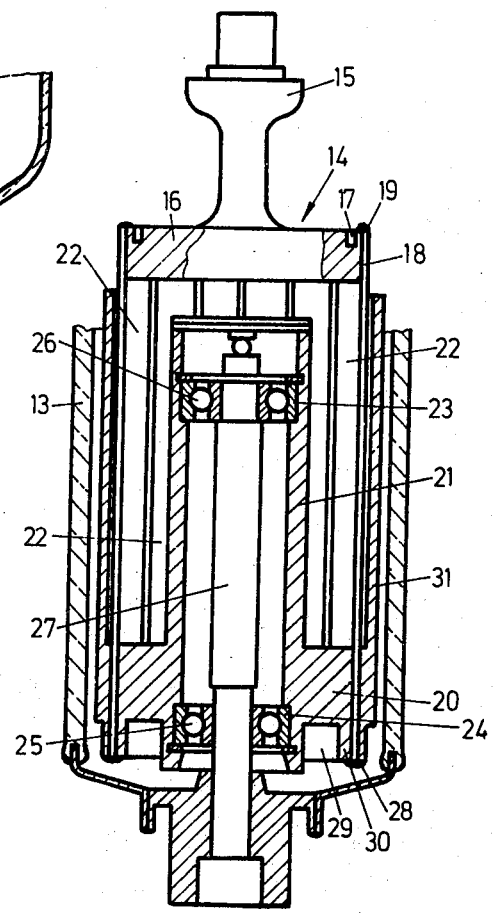
FIG. 2 is a section through a rotary anode wherein the above-mentioned connection consists of a tubular part composed of resilient steel bands located next to each other.

FIG. 2 shows a part of a glass container 13 containing a rotary system 14 wherein the rotary anode is taken from the axle 15. The anode axle 15 is connected with the supporting plate 16 having a groove 17 extending parallel to its edge to which a tubular damping part 18 is soldered, as shown by the weld 19. The supporting plate 16 is connected with the connecting plate 20 of the rotary tube 21 by the parts 22 constituting sheet springs which form the tubular part 18. The tube 21 is connected with spaced outer rings 23 and 24 of the bearings 25 and 26, while the inner rings of the bearings lie upon the supporting axle 27.

When this embodiment of the present invention is operated in the same manner as that shown in FIG. 1, the embodiment of FIG. 2 has the advantage that constructively a more simple arrangement is possible. The reason is that all parts are so shaped and arranged that soldering connections 19 and 28 are sufficient. The weld 19 connects the ends of the springs 22 with the edge of the plate 16. The plate 16 is made narrower by the groove 17 extending parallel to the edge to simplify the welding. The plate 20 also has a groove 29 provided with an edge 30 the thickness of which permits a so-called three element welding. Thus the edge 30, the springs 22 and the rotor 31 are interconnected in one operation.

This solution used in the embodiment of FIG. 2, which facilitates the welding can be also used in the embodiment of FIG. 1 when the tubular parts are similarly constructed.

I claim:

1. An X-ray tube with a rotary anode, comprising an anode plate, a driving rotor and two spaced bearings, each of said bearings having an inner ring and an outer ring one of said bearings being located closer to said anode plate than the other bearing, a thin-walled resilient tube having one end connected with said anode plate and connected at least adjacent to its other end with the driving rotor and the outer ring of said other bearing, which ring is connected with the outer ring of said closer bearing, and a shaft fastened to the bulb of the X-ray tube, the inner rings of the bearings being connected to said shaft.

2. A rotary anode according to claim 1, wherein said tube comprises slits extending parallel to the longitudinal direction of the tube.

3. A rotary anode according to claim 2, wherein the straps extending between the slits are flat.

4. A rotary anode according to claim 1, wherein said tube consists of resilient strips circumferentially enclosing the axis of the tube.

5. A rotary anode according to claim 4, wherein said strips have round cross-sections.

* * * * *